Nov. 24, 1936.        J. R. GOLDEN        2,061,703
VALVE
Filed Jan. 12, 1935
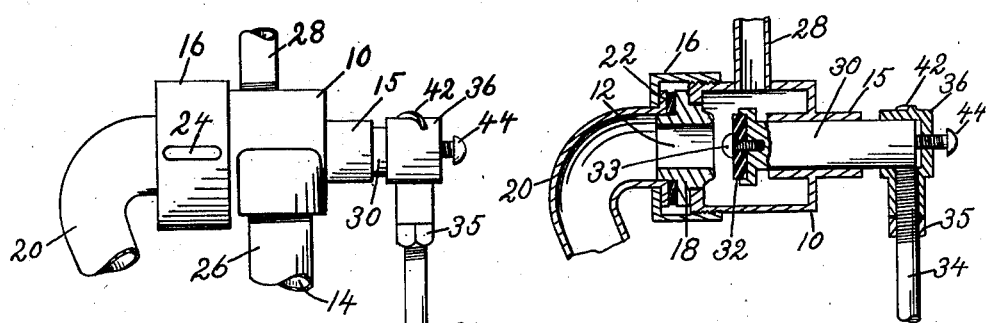
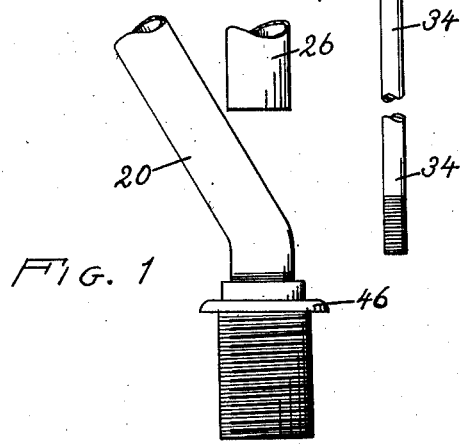
Fig. 1
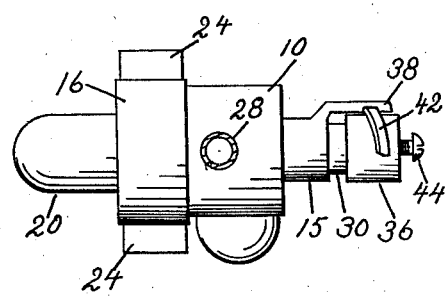
Fig. 2
Fig. 3
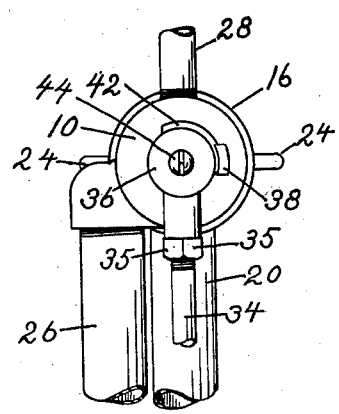
Fig. 4
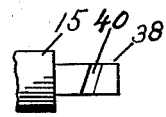
Fig. 5
JOHN R. GOLDEN
INVENTOR
BY Leon T. Hooper
ATTORNEY Patented Nov. 24, 1936

2,061,703

UNITED STATES PATENT OFFICE 2,061,703

VALVE

John R. Golden, Hammond, Ind.

Application January 12, 1935, Serial No. 1,531

1 Claim. (Cl. 251—39)

This invention relates to an improvement in float actuated valves which are generally used in reservoirs or other containers where it is found desirable to cut off the supply when the liquid, usually water, has reached a predetermined level.

The chief object of this invention resides in the production of an article of the class referred to which shall consist of a few simple parts, which require a minimum of machining, are easily assembled, and which are readily accessible for repair or replacement when in use.

A further important object of the valve of this invention resides in the fact that the float lever is connected directly to the valve stem.

Another and further important object of the invention resides in the provision of means for imparting a rotative and longitudinal movement to the stem in opening or closing the valve.

A still further important object of the valve of this invention is the fact that the adjustment screw, which contacts the end of the stem, may be used to control the level of the water, thus eliminating such crude methods as bending the float rod or the like.

Still another and further important object of the invention resides in the provision of means whereby the replaceable seat is positioned within the union joint and is secured in position against the body of the valve.

Additional objects of advantage and importance, such as accessibility of all parts for replacement or adjustment, simplicity, sturdiness, limited number of component parts, the fact that various parts may be replaced without the aid of special tools and others, some of which are hereinafter more fully set forth, will be apparent from the following specification and accompanying drawing.

In the drawing:

Figure 1 is a side elevation of the valve of this invention with parts broken away.

Figure 2 is a side elevation of the valve partly in section, and shows the relative positions of the various parts when the valve is in the closed position.

Figure 3 is a top plan view of the valve.

Figure 4 is a front elevation thereof.

Figure 5 is a fragmental view showing a portion of the stem housing and the arm with the spiral groove therein.

As shown in the drawing:

The reference numeral 10 indicates in a general way the body of the valve of this invention, which in the preferred construction, as shown in the drawing has an inlet passageway 12 and an outlet passageway 14. A valve stem housing 15 in alignment with the intake passageway is preferably formed integral with the body 10 of the valve.

Secured against the body 10 and within the inlet passageway 12, by the union nut 16, is a replaceable valve seat 18. A restricted portion of the seat extends into the inlet pipe 20, and a shoulder thereof extends over and secures a gasket 22 in engagement with the expanded end of the intake pipe 20 to form a water tight joint. Wings 24, on opposed sides of the union nut 16, permit said nut to be secured to the body by hand without the use of a wrench or other tools.

Screw threadedly secured in the outlet passageway 14 is a discharge pipe 26 for directing the flow of incoming water downwardly into the container. A smaller pipe 28 connected to the top of the body 10, conveys water directly to the trap during operation of the valve.

Positioned within the valve stem housing 15 is a valve stem 30, which is both rotatively and longitudinally movable. The inner end of the stem 30 is recessed to receive a washer 32, which is secured in position by a screw 33.

Secured to the outwardly extending end of the stem 30, by the float lever 34, which functions as a set screw, as is clearly shown in Figure 3, is an actuating member 36. It will be apparent that the portion of the stem adapted to receive the end of the float lever 34 may be faced or slotted if desired to assist the lock nut 35 in maintaining the two parts in engagement.

Extending outwardly from the valve stem housing 15 and parallel to the valve stem is an arm 38 which is diagonally slotted, as is best shown by the reference numeral 40 in Figure 5.

Positioned on the actuating member 36, is a boss 42, adapted to cooperate with the groove 40 and to impart a longitudinal movement to the stem when the float lever 34 is raised or lowered.

The raising or lowering of the float lever 34, when in operative position, also causes the stem to rotate simultaneously with its longitudinal movement. This particular movement, longitudinal and rotative, insures a perfect seating in closing the valve; and in opening the movement prevents portions of the resilient washer 32 from sticking to the seat 18, and pulling free from and thus pitting the resilient washer.

Positioned in the actuating member 36 and contacting the end of the valve stem 30, is an adjustment screw 44. By manipulating this screw the valve stem may be moved toward or away from the seat 18, thus causing a correspondingly altered movement in the float lever 34, in closing or opening the intake passageway 12.

The entire valve and associated parts is supported in the tank or container by the intake pipe 20, which is screw threadedly associated with a conventional fitting 46.

It will be apparent from the foregoing that herein is provided a positive acting valve which is composed of a few simple and sturdy parts.

Moreover, because of its limited number of parts, it may be economically manufactured and because of its accessibility for repairs and adjustment after installation, its use will be universal.

I am aware that many changes may be made and numerous details of construction varied throughout a wide range without departing from the principles of this invention and I, therefore, do not purpose limiting the patent granted hereon otherwise than as necessitated by the prior art.

I claim as my invention:

In a valve, a body, a stem projecting from said body, an actuating member positioned on said stem and maintained in position by a screw threaded member, a portion of said actuating member adapted to slidably engage a portion of said body, and adjustment means between the end of said stem and said actuating member.

JOHN R. GOLDEN.